United States Patent [19]

Reich et al.

[11] 4,386,193

[45] May 31, 1983

[54] CYANOACRYLATE ADHESIVE COMPOSITION

[75] Inventors: Karl Reich, Carlsberg; Heinz A. Tomaschek, Heidelberg, both of Fed. Rep. of Germany

[73] Assignee: Teroson G.m.b.H., Heidelberg, Fed. Rep. of Germany

[21] Appl. No.: 275,376

[22] Filed: Jun. 19, 1981

Related U.S. Application Data

[63] Continuation-in-part of Ser. No. 242,509, Mar. 10, 1981, abandoned.

[51] Int. Cl.³ .............................................. C08F 20/42
[52] U.S. Cl. .................................. 526/298; 428/514; 526/194; 526/204; 526/209; 526/270
[58] Field of Search ............... 526/194, 204, 209, 298, 526/270

[56] References Cited

U.S. PATENT DOCUMENTS 3,839,065  10/1974  Overhults et al. ................... 526/298

Primary Examiner—Harry Wong, Jr.
Attorney, Agent, or Firm—Howard J. Troffkin

[57] ABSTRACT

A rapid setting α-cyanoacrylate based adhesive composition having an improved polymerization catalyst therein. The polymerization catalyst is composed of at least one 3-arm or at least one 4-arm podand compound or mixtures thereof of the general formula:

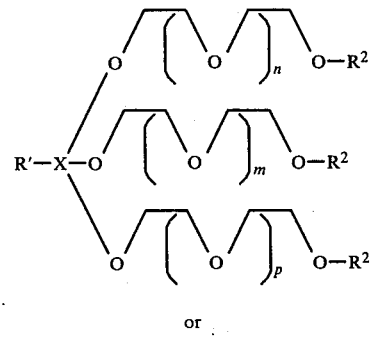

or

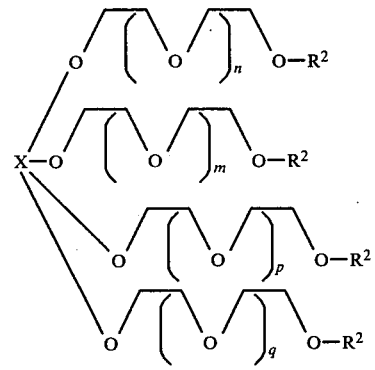

11 Claims, No Drawings

CYANOACRYLATE ADHESIVE COMPOSITION

This application is a copending continuation-in-part application of U.S. Ser. No. 242,509 filed Mar. 10, 1981, and now abandoned.

BACKGROUND OF INVENTION

The present invention relates to a rapid-setting α-cyanoacrylate based adhesive composition having good storage stability and, in particular, to an adhesive composition having a very fast setting time on wood and other substrates with a porous/acid surface.

α-cyanoacrylates of general formula

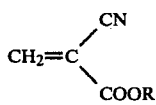

are rapid-setting adhesives which are ideally suited for the adhesion of a large number of materials. The parts can be joined in an extremely short time of only a few seconds and the adhesive joints produced in this way have good mechanical strength characteristics. The adhesives are hardened by anionic polymerization initiated by even small traces of extremely weak basic-acting compounds (Lewis bases) such as, for example, water or methanol.

When using such α-cyanoacrylates adhesives on wood, leather and other porous/acid surfaces, there is the problem that the anionic polymerization of the α-cyanoacrylate is inhibited in spite of the high moisture content which should in fact aid the polymerization. As a result, the adhesive setting time is too long for practical use. In addition, such adhesives tend to penetrate the pores of the surfaces to be adhered to one another, so that in the case of porous material, the strength of the adhesive joint is impaired due to the protracted setting time.

However, because the distinct advantage of α-cyanoacrylate based adhesives is their short setting time, numerous measures have been attempted to reduce the setting times on wood and similar materials. One of these measures involves treating one of the wood surfaces to be joined with a primer and the other with an α-cyanoacrylate adhesive composition. Polymerization occurs on contacting the treated surfaces together. The required added operation of applying a primer is a serious disadvantage to such process. Another measure involves reducing the quantity of acid stabilizers present for satisfactory storage stability of the α-cyanoacrylate adhesive compositions. However, although this reduces the setting time, such adhesive compositions have an increased tendency to prematurely harden during storage.

Therefore, polymerization catalysts have been proposed which are suitable for use in single-component systems and which reduce the setting times of such α-cyanoacrylate adhesives without excessively impairing their storage stability. According to DE-OS No. 2,816,836 the setting time of α-cyanoacrylate adhesives is reduced by adding to the adhesive composition approximately 0.1 ppm or more of a macrocyclic polyether compound from the group of macrocyclic polyethers and their analogs. The most serious disadvantage of such accelerators relates to their synthesis which, even when the dilution principle is used, only supplies the desired product in low yields, because the tendency to produce intermolecular linkages which form chains is greater than that for intramolecular linkages which form macrocycles. Further, U.S. Pat. No. 4,170,585 suggests the addition of approximately 0.0001 to 20% by weight of a polyethylene glycol with a degree of polymerization of at least 3 or a non-ionic surfactant with a polyethyleneoxy content (degree of polymerization also at least 3) or mixtures thereof to α-cyanoacrylate based adhesive compositions. These compounds, however, have the disadvantage in that they have a great tendency to contain water and low molecular weight polyethylene glycol ether which are difficult to remove and spontaneously initiate polymerization when the compounds are added to α-cyanoacrylates.

The two specifications discussed above also describe in detail the disadvantages commonly associated with α-cyanoacrylate adhesives when used on wood, leather and other porous/acid surfaces as mentioned above.

It has now been surprisingly found that the above difficulties and disadvantages of the prior art polymerization catalysts can be obviated by the use of certain compounds described herein below as polymerization catalysts contained in α-cyanoacrylate-based adhesive compositions. These compounds can be easily prepared in high yield and purity, are free from polymerization-initiating substances, require only limited concentrations in the resulting adhesive compositions based on α-cyanoacrylate and lead to greatly reduced setting times on wood and other porous/acid surfaces. It has also been found that the susceptibility to water can be still further reduced by the addition of suitable compounds described herein below which result in improved storage stability of such adhesive compositions.

DETAILED DESCRIPTION OF INVENTION

The present invention is directed to adhesive compositions based on α-cyanoacrylate and which contain a polymerization catalyst and may contain conventional additives as described herein and in the appended claims.

The generally known α-cyanoacrylates which serve as a basis for the adhesive composition according to the invention are of general formula:

wherein R is straight or branched-chain alkyl group such as methyl, ethyl, n-propyl, isopropyl, n-butyl, isobutyl, pentyl, hexyl, and the like as well as a halogen atom or alkoxy group substituted alkyl such as 2-chlorethyl, 3-chloropropyl, 2-chlorobutyl, trifluoroethyl, 2-methoxyethyl, 3-methoxybutyl, 2-ethoxyethyl group and the like; a straight or branched-chain alkenyl group such as allyl, methallyl, crotyl and the like; a straight or branched-chain alkinyl group, such as propargyl and the like; cycloalkyl group such as cyclohexyl, and the like; an aryl group, such as benzyl, phenyl and the like; or an aralkyl group, such as cresyl and the like. Further, German published application DE-OS No. 2,816,836 refers to a large number of suitable α-cyanoacrylates which are incorporated herein by reference. The adhesive compositions according to the invention may, in addition, contain conventional additives such as polymerization inhibitors, thickeners, plasticizers, perfumes, dyes, pigments, etc. These additives are conventionally known, form part of the prior art and examples of them are described in the herein above mentioned references.

The present compounds found useful as polymerization catalysts in the adhesive compositions according to the invention are open-chain, 3 or 4-arm and consequently branched-chain orthoester podands having 3 or 4 donor atoms containing arms, with the general formulas

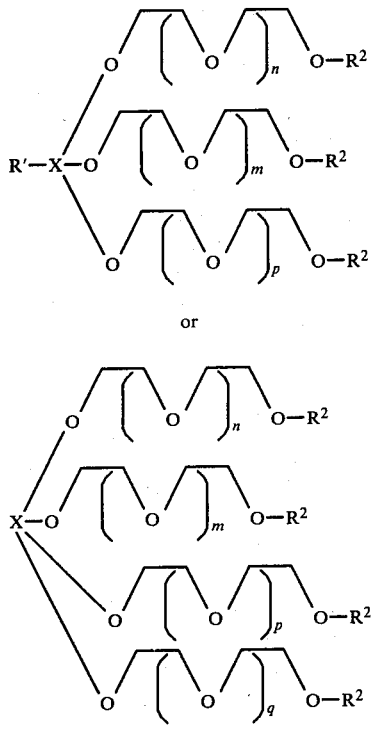

in which X represents a central atom capable of forming four chemical bonds with 4 adjacent atoms such as a carbon or silicon atom, $R^1$ hydrogen atom or a short-chain alkyl group, with respect to the 3-armed podand, it is preferred that when X is carbon, $R^1$ is either hydrogen or alkyl and when X is silicon $R^1$ is alkyl. $R^2$ represents a short-chain alkyl group. Generally, when $R^1$ and/or $R^2$ are an alkyl group it is preferred that the group contain no more than 4 carbon atoms such that, for example, each can independently be selected from methyl, ethyl, n-propyl, isopropyl, n-butyl, isobutyl, t-butyl and the like. The symbols m, n, p and q each represent whole numbers. The central four-bond atom is preferably a carbon or silicon atom. Preferred orthoester podands are therefore orthoformic, orthoacetic, orthocarbonic, orthomethylsiliconic and orthosilicic acid esters, as well as mixtures thereof. Good results are also obtained with orthoester podands in which $R^1$ and $R^2$, independently of one another, stand for a methyl, ethyl, n-propyl, isopropyl, n-butyl or isobutyl group. The three and four arm podand compounds can each be used singly or as mixtures of compounds to form the polymerization catalyst of the subject invention.

The podand chain can be a polyalkylene glycol, such as polyethylene glycol. The chain length of each of the chains of the orthoester podands can vary within a wide range. Chains have proved favorable for which m, n, p and q each assume a value between 2 and 50 and preferably between 3 and 20. In the case of values for m, n, p and q above 50, there is generally no additional significant acceleration of the adhesion of wood with α-cyanoacrylate.

The use of the adhesive compositions according to the invention eliminates the otherwise conventional inhibition of polymerization of α-cyanoacrylates on wood and other substrates with porous/acid surfaces. Due to the favorable action of the presently described polymerization catalysts, it is only necessary to mix with the α-cyanoacrylates based adhesive the subject polymerization catalyst in quantities of 0.01 to 10% by weight and preferably 0.01 to 5% by weight based on the total weight of the adhesive composition. For example, wood adhesive joints with an excellent mechanical strength can be obtained when using α-cyanoacrylate based adhesive compositions having the above described quantities of the subject polymerization catalyst. In the case of all the adhesive joints made, after storing at ambient temperature for 24 hours, the wood fractured when testing the tensile and shear strength in the tensile test.

It was also surprisingly found that the addition of 3 or 4-membered orthoester podands to α-cyanoacrylate not only leads to a further reduction in the setting time when adhesively joining materials with inhibiting, acid surfaces, particularly wood, but also greatly improves the storage stability of the subject adhesive compositions.

It is known that during storage, α-cyanoacrylates tend to undergo premature polymerization and/or agglomeration to a greater or lesser extent. This behaviour is particularly apparent when carrying out accelerated ageing under standard storage tests at 70° C. It has been unexpectedly found that no agglomeration takes place in the 70° C. storage test when the polymerization catalysts based on orthoester podands according to the present invention are added to α-cyanoacrylate charges which normally have an agglomeration tendency.

A further unexpected and highly desired advantage of the orthoester podands according to the present invention is that they can be easily synthesized. This takes place in a high yield from inexpensive, low molecular weight starting substances and is particularly economical due to the easy elimination of undesired by-products. DE-OS No. 2,062,034 and U.S. Pat. No. 3,903,006 describe the synthesis of low molecular weight polyethylene glycol monoether esters of orthoformic acid and homologs thereof for use as constituents of hydraulic fluids.

The polyethylene glycol monoether esters of orthocarbonic acid, orthosilicic acid and alkyl siliconic acid of the present invention are novel compounds.

Synthesis of these new compounds can be performed using known process steps. Synthesis of the orthocarbonic acid esters can be carried out by acid catalyzed reaction of lower alkyl esters (methyl, ethyl esters and the like) of the relevant ortho acids, accompanied by azeotropic distillation of the lower alcohols formed by means of a suitable carrier (e.g. benzene, toluene). The corresponding chlorosilanes can be reacted with a polyalkylene glycol, such as polyethylene glycol monoethers to prepare the alkylsilionic acid esters and orthosilicic acid esters.

The 3 and 4-armed orthoester podands used as polymerization catalysts are readily introduced into the α-cyanoacrylate based adhesive compositions of the present invention as a solution using an organic solvent. For example, anhydrous aromatic hydrocarbons such as benzene, toluene and xylenes are suitable for this purpose. However, it is also possible to use chlorinated hydrocarbons such as methylene chloride, chloroform or carbon tetrachloride, without adversely influencing the storage stability of the resultant adhesive compositions.

The properties of the adhesive compositions according to the invention can be further improved by adding furane derivatives. Suitable furane derivatives are 2,-dihydro-5-alkoxy-furan-2-one also known as 2,5-d hydro-5-alkoxy-furan-2-one (IUPAC nomenclature) and 2,5-dialkoxy-2,5-dihydrofurane in accordance with the following general formulas:

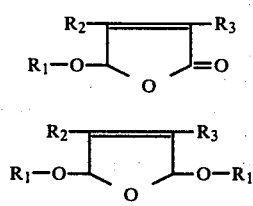

in which each $R_1$ stands for a straight or branched-chain alkyl or alkenyl radical, a cycloalkyl radical, a phenyl radical, a benzyl radical or an acetyl radical and $R_2$ and $R_3$, independently of one another, stand for hydrogen, straight and branched-chain alkyl and alkenyl radicals, cycloalkyl radicals, phenyl radicals, benzyl radicals, acetyl radicals and halogen. Said alkyl, alkenyl, cycloalkyl, phenyl or benzyl radicals being those described herein above with respect to the podand compound. Preferably, $R_1$ can stand for a methyl, ethyl, n-propyl, isopropyl, n-butyl, pentyl, hexyl, octyl, dodecyl or cyclohexyl radical and $R_2$ and $R_3$, independently of one another can stand for hydrogen, chlorine, bromine, methyl radicals or phenyl radicals. The preparation of these furane derivatives is known from the literature and can be performed using standard techniques. The adhesive compositions of the present invention can contain approximately 1 ppm to 20% by weight and preferably 10 ppm to 10% by weight of these furane derivatives based on the total weight of the adhesive composition.

The action of the above-described furane derivatives has been unexpectedly found to consist of a considerable reduction in the susceptibility of the α-cyanoacrylate adhesive compositions to water, leading to an improvement of the storage stability and/or a simplification of storage.

The following examples are given for illustrative purposes only and are not meant to be a limitation on the subject invention except as defined by the claimed appended hereto. All parts and percentages are by weight unless otherwise indicated.

EXAMPLE 1

15.9 g of trimethyl orthoformate, 100 g of anhydrous tetraethylene glycol monomethyl ether, 0.1 g of 4-methyl benzene sulphonic acid and 300 ml of anhydrous toluene were refluxed with the aid of a packed column with the top fitted. The azeotropic mixture comprising methanol and toluene boiling at 64° C. was distilled until there was no further drop in the boiling point of toluene (110° C.) on switching over to total reflux. At the end of the reaction, the reaction mixture was cooled, the toluene solution obtained was extracted by shaking with aqueous $NaHCO_3$ solution, dried with $Na_2SO_4$ and the solvent was distilled off in vacuo. 99.3 g (97.6% of theory) of crude tris-(tetraethylene glycol monomethyl ether)-orthoformate (colourless liquid) were obtained.

The crude product was distilled in high vacuum to remove unreacted tetraethylene glycol monomethyl ether. At a pressure of $8 \times 10^{-5}$ mbar and an evaporator temperature of 130° C., firstly 11.8 g of the colourless liquid were distilled off. The residue was again distilled off at $5 \times 10^{-5}$ mbar/s50°–260° C. and 84.9 g (89.3%) of pure tris-(tetraethylene glycol monomethyl ether)-orthoformate were obtained.

An adhesive composition was prepared from 9.8 g of ethyl-2-cyanoacrylate (thickened with 8.7% by weight of polymethyl methacrylate and stabilized with 10 ppm of polyphosphoric acid, 50 ppm $SO_2$ and 500 ppm of hydroquinone) and 0.2 g of a 50% solution of tris-(tetraethylene glycol monomethyl ether)-orthoformate in anhydrous toluene. For comparison purposes, the same mixture was prepared without the addition of the polymerization catalyst.

Using the presently prepared compositions, overlapping adhesive joints of testpieces with dimensions $80 \times 25 \times 6$ mm were produced from different wood species. The setting time was taken as the value at which there was a definite joining of the parts under manual tensile testing. The results obtained are given in the following table:

| Wood Species | Setting time of adhesive composition at 23° C. in sec. on testpieces stored under ambient climatic conditions. | |
|---|---|---|
| | Without polymerization accelerator | With polymerization accelerator |
| Limba | 50–80 | 6–8 |
| Beech | 180–210 | 15–20 |
| Spruce | approx. 240 | 25–30 |
| Oak | approx. 360 | 20–25 |

The wood of all the testpieces fractured on determining the tensile and shear strength in the tensile test after storing for 24 hours at ambient temperature.

To determine the storage stability, the accelerated ageing of the present adhesive composition was performed at 70° C. for 5 days. It was found that at the end of this time, which corresponds to the standard storage at ambient temperature of approximately 1 year, the adhesive composition containing the polymerization accelerator did not display a viscosity rise or an increase in the setting time.

EXAMPLE 2

37.3 g of anhydrous polyethylene glycol-350-monomethylether, 2.9 g of tetramethyl orthocarbonate, 150 ml of anhydrous toluene and 50 mg of 4-methyl benzene sulphonic acid were refluxed with the aid of a packed column with fitted top. The distillation of the reaction mixture was performed as in Example 1 above. 34.2 g (89.2%) of crude tetrakis-(polyethylene glycol-350-monomethyl ether)-orthocarbonate were obtained.

By high vacuum distillation at a pressure of $2 \times 10^{-5}$ mbar and an evaporator temperature of 140° C. 9.0 g of a distillate were obtained which essentially comprised polyethylene glycol-350-monomethyl ether. The distillation residue consisted of 24.1 g of pure tetrakis-(polyethylene glycol-350-monomethyl ether)-orthocarbonate.

The setting times and storage stability were determined as in Example 1 on an ethyl-2-cyanoacrylate adhesive composition containing 2% of a 50% solution of tetrakis-(polyethylene glycol-350-monomethyl ether)-orthocarbonate in the anhydrous toluene. The following values were obtained:

| | Setting time of adhesive composition at 23° C. in sec. on testpieces stored under ambient climatic conditions. | |
|---|---|---|
| Wood Species | Without polymerization accelerator | With polymerization accelerator |
| Limba | 50–80 | 1–2 |
| Beech | 180–210 | 3–5 |
| Spruce | approx. 240 | 8–10 |
| Oak | approx. 360 | 5–8 |

The storage stability after 5 days at 70° C. was unchanged. The tensile and shear strength of testpieces tested after 24 hours as in Example 1 caused fracture of the material while the formed bond remained intact.

EXAMPLE 3

28 g of anhydrous polyethylene glycol-350-monomethyl ether were placed in a vessel and accompanied by stirring 3.4 g of freshly distilled tetrachlorosilane were added dropwise at 5° C. within 5 minutes. The reaction mixture was stirred for an additional 10 minutes at 5° C., then stirred for 3 hours at ambient temperature, and finally heated at 80° C. for an additional 4 hours. The crude product obtained (28.6 g, 100%) was freed from lower-boiling fractions in high vacuum.

At a pressure of $2 \times 10^{-5}$ mbar and an evaporator temperature of 170° C., 3.2 g of a colourless liquid were distilled off. The residue consisted of 24.1 g (84.6%) of tetrakis-(polyethylene glycol-350-monomethyl ether)-orthosilicate.

An ethyl-2-cyanacrylate adhesive composition, containing 1% of a 50% solution of tetrakis-(polyethylene glycol-350-monomethyl ether)-orthosilicate in anhydrous toluene gave the following values for the setting time on wood:

| | Setting time of adhesive composition at 23° C. in sec. on testpieces stored under ambient climatic conditions. | |
|---|---|---|
| Wood Species | Without polymerization accelerator | With polymerization accelerator |
| Limba | 50–80 | 2–3 |
| Beech | 180–210 | 3–5 |
| Spruce | approx. 240 | 5–6 |
| Oak | approx. 360 | 10–12 |

The storage stability after 5 days at 70° C. was unchanged. The tensile and shear strength was tested on testpieces after 24 hours in the same way as in Example 1. Each sample fractured in the wood leaving the formed bond intact.

EXAMPLE 4

An ethyl-2-cyanoacrylate charge which, on storage in polyethylene bottles, had an agglomeration tendency in the gas chamber was thickened with 8.7% by weight of polymethyl methacrylate. In addition, 2% by weight of a 50% by weight solution of tetrakis-(polyethylene glycol-350-monomethyl ether)-orthocarbonate was added to a portion of this mixture. Both the treated and untreated adhesive compositions were stored for 5 days at 70° C. The adhesive composition containing no polymerization accelerator according to the invention revealed pronounced agglomeration on the vessel wall, while the adhesive composition containing the polymerization accelerator according to the invention was completely free of agglomerates.

While the invention has been described in connection with certain preferred embodiments, it is not intended to limit the invention to the particular form set forth, but, on the contrary, it is intended to cover such alternatives, modifications and equivalents as defined by the appended claims.

What is claimed is:

1. An α-cyanoacrylate based adhesive composition having a catalytic amount of polymerization catalyst therein; said polymerization catalyst comprises at least one three or four arm podand compound of the general formula:

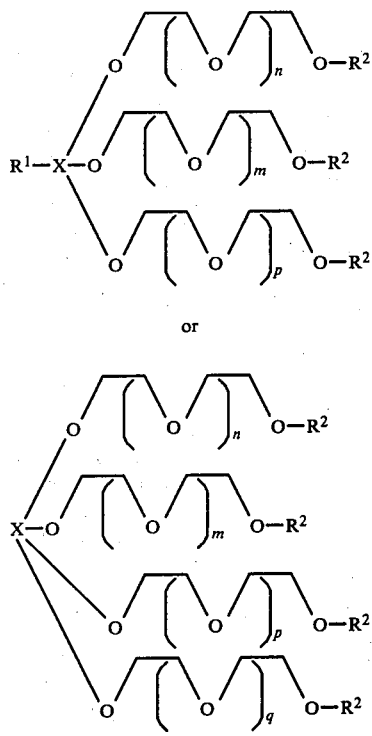

in which X is selected from a carbon atom or a silicon atom, $R^1$ represents hydrogen or a lower alkyl group, each $R^2$ separately represents a lower alkyl group and m, n, p, and q each represent a whole number of from about 2 to 50.

2. An α-cyanoacrylate based adhesive composition of claim 1 wherein the podand compounds of the polymerization catalyst have polyethylene glycol chains for which each m, n, p and q represents a number between 3 and 20.

3. The α-cyanoacrylate based adhesive composition of claim 1 wherein the podand compounds of the polymerization catalyst have $R^1$ and $R^2$ groups which are each independently a $C_1$–$C_4$ alkyl group.

4. The α-cyanoacrylate based adhesive composition of claim 1 wherein the podand compounds of the polymerization catalyst are esters of an acid selected from the group consisting of orthoformic acid, orthoacetic acid, orthocarbonic acid, orthomethyl siliconic acid and silicic acid.

5. The α-cyanoacrylate based adhesive composition of claim 1 wherein said polymerization catalyst contains from about 0.01 to 10 percent by weight based on the total weight of the adhesive composition of said podand compounds.

6. The α-cyanoacrylate based adhesive composition of claim 5 wherein said podand compounds are present in from about 0.01 to 5 percent by weight based on the total weight of the adhesive composition.

7. The α-cyanoacrylate based adhesive composition of claim 1, 2, 3, 4 or 5 wherein said polymerization catalyst comprises podand compounds in which X is a carbon atom.

8. The α-cyanoacrylate based adhesive composition of claim 1, 2, 3, 4 or 5 wherein the polymerization catalyst further comprises a furane derivative of the general formula

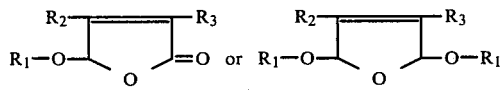

in which $R_1$ stands for a straight or branched-chain alkyl or alkenyl radical, a cycloalkyl radical, a phenyl radical, a benzyl radical or an acetyl radical and $R_2$ and $R_3$, independently of one another, stand for hydrogen, straight or branched-chain alkyl radicals, straight or branched chain alkenyl radicals, cycloalkyl radicals, phenyl radicals, benzyl radicals, acetyl radicals or halogen.

9. The α-cyanoacrylate based adhesive composition of claim 1 wherein the α-cyanoacrylate is of the general formula:

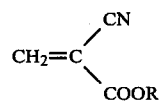

in which R is a straight or branched-chain alkyl group which can be substituted with a halogen atom or an alkoxy group, a straight or branched chain alkenyl group, a straight or branched chain alkinyl group, a cycloalkyl group, an aralkyl group or an aryl group.

10. The α-cyanoacrylate based adhesive composition of claim 1 wherein said polymerization catalyst comprises at least one three arm podand compound in which X is selected from a carbon atom or a silicon atom such that when X is a carbon atom $R^1$ is selected from hydrogen or a lower alkyl group and when X is a silicon atom $R^1$ is selected from a lower alkyl group.

11. The α-cyanoacrylate based adhesive composition of claim 1 wherein said polymerization catalyst comprises a three arm podand compound in which when X is carbon, $R^1$ is selected from hydrogen or alkyl and when X is silicon $R^1$ is alkyl.

* * * * *

UNITED STATES PATENT AND TRADEMARK OFFICE
CERTIFICATE OF CORRECTION

PATENT NO. : 4,386,193    Page 1 of 2
DATED     : May 31, 1983
INVENTOR(S) : Karl Reich et al It is certified that error appears in the above-identified patent and that said Letters Patent are hereby corrected as shown below:

In the Abstract, lines 6 et seq., in Column 3, lines 12-40 and in Column 8, lines 25-55, delete the formulaes:

"

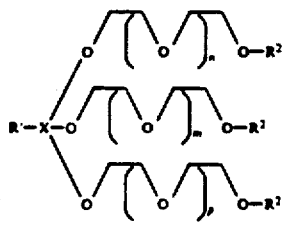

or

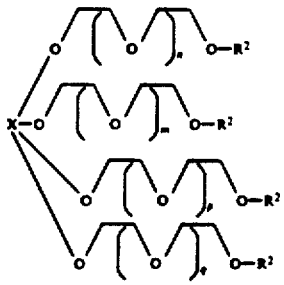

"

and insert in lieu thereof

UNITED STATES PATENT AND TRADEMARK OFFICE
CERTIFICATE OF CORRECTION

PATENT NO. : 4,386,193

DATED : May 31, 1983

INVENTOR(S) : Karl Reich et al

It is certified that error appears in the above-identified patent and that said Letters Patent is hereby corrected as shown below:

--

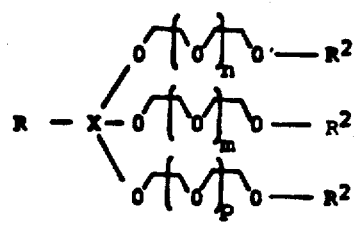

or

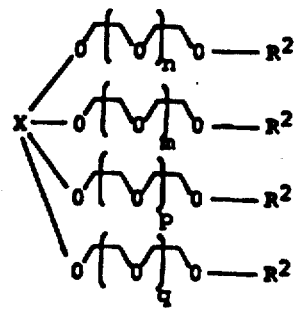

--

Signed and Sealed this

Second Day of August 1983

[SEAL]

Attest:

GERALD J. MOSSINGHOFF

Attesting Officer    Commissioner of Patents and Trademarks